US007284137B2

(12) United States Patent
Clark et al.

(10) Patent No.: US 7,284,137 B2
(45) Date of Patent: Oct. 16, 2007

(54) SYSTEM AND METHOD FOR MANAGING POWER CONSUMPTION WITHIN AN INTEGRATED CIRCUIT

(75) Inventors: Lawrence T Clark, Albuquerque, NM (US); Michael W. Morrow, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 10/881,004

(22) Filed: Jun. 29, 2004

(65) Prior Publication Data

US 2005/0289367 A1    Dec. 29, 2005

(51) Int. Cl.
G06F 1/00 (2006.01)
G06F 1/32 (2006.01)
(52) U.S. Cl. .................. 713/300; 713/320; 713/324
(58) Field of Classification Search ............... 713/300, 713/320, 324; 455/522, 127.1, 566; 365/299; 379/355.09; 707/1
See application file for complete search history.

(56) References Cited

U.S. PATENT DOCUMENTS 4,963,769 A * 10/1990 Hiltpold et al. ........ 365/185.18
6,901,523 B2 * 5/2005 Verdun ..................... 713/320
6,957,078 B1 * 10/2005 Yousefi et al. ............ 455/522
7,068,974 B1 * 6/2006 Linsky et al. ............ 455/12.1
7,082,543 B2 * 7/2006 Lin .......................... 713/320

FOREIGN PATENT DOCUMENTS

EP    1168667 A2 *  1/2002
EP    1168668 A2 *  1/2002

* cited by examiner

Primary Examiner—Chun Cao
Assistant Examiner—Suresh K Suryawanshi
(74) Attorney, Agent, or Firm—Schwegman, Lundberg & Woessner, P.A.

(57) ABSTRACT

An integrated circuit includes power gating circuits for coupling an associated circuit block with a power supply voltage. The power gating circuits also generate power consumption measurements for the associated circuit blocks. A power manager for the integrated circuit may manage the overall power consumption of the integrated circuit and may individually turn on and off the circuit blocks using the power gating circuits.

32 Claims, 6 Drawing Sheets

POWER GATING CIRCUIT

| APPLIED VOLTAGE | MEASURED VALUE |
|---|---|
| 0.85 | 90 |
| 0.9 | 105 |
| 0.95 | 121 |
| 1.0 | 144 |
| ↖602 | ↖604 |

WIRELESS COMMUNICATION DEVICE

SYSTEM AND METHOD FOR MANAGING POWER CONSUMPTION WITHIN AN INTEGRATED CIRCUIT

TECHNICAL FIELD

Embodiments of the present invention pertain to integrated circuits and power consumption management.

BACKGROUND

Conventional integrated circuits generally include many functional blocks. These functional blocks may be logic blocks including input/output (I/O) circuitry and processors. Each of these functional blocks may consume current during operations performed by the integrated circuit. During some operations, some functional blocks may not be needed and it may be desirable to place these functional blocks in a standby mode to help reduce current consumption. During some operations, some functional blocks may consume excessive current. Excessive current consumption by functional blocks may lead to thermal problems and reduced reliability. Spikes in current consumption and excessive current consumption may reduce battery life in battery powered devices. In some cases, this excessive and/or peak current consumption may be reduced by better management of an integrated circuit's power consumption, such as performing these operations at different times or with other functional blocks. Conventional integrated circuits are generally not able to monitor in-situ current consumption of their individual circuit blocks, making it difficult to manage the power consumption of the individual function blocks as well as making it difficult to manage the overall power consumption of the entire integrated circuit.

Thus there are general needs for managing the power consumption of integrated circuits.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
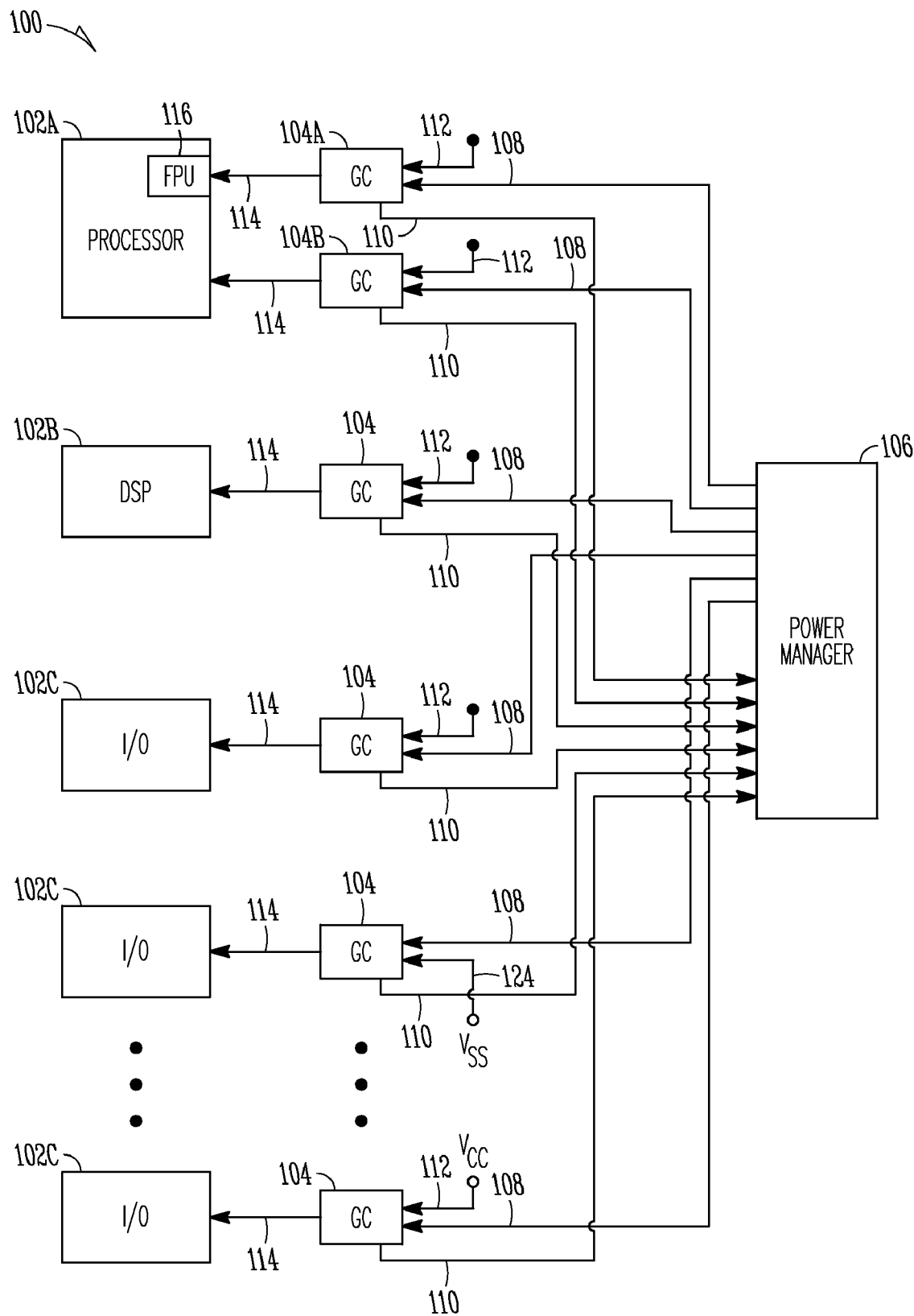
FIG. 1 is a block diagram of an integrated circuit in accordance with some embodiments of the present invention.

FIG. 1 is a block diagram of an integrated circuit in accordance with some embodiments of the present invention. Integrated circuit 100 may comprise a plurality of circuit blocks 102 and power gating circuits (GC) 104 to selectively couple an associated one of circuit blocks 102 with a supply voltage. Integrated circuit 100 may also include power manager 106 to control the selective coupling of power gating circuits 104.

In some embodiments, circuit blocks 102 include microprocessor 102A, digital signal processor (DSP) 102B, and one or more input-output (I/O) circuits 102C, as well as other logic circuit blocks not separately illustrated. In some embodiments, integrated circuit 100 may be a microprocessor system, or system on a chip, although the scope of the invention is not limited in this respect.

In accordance with some embodiments, power manager 106 manages the power consumption of integrated circuit 100 by monitoring the individual power consumption of at least some of circuit blocks 102 using gating circuits 104. In this way, power manager 106 may manage and control the overall power consumption of integrated circuit 100 by gating-on and gating-off one or more of circuit blocks 102. This is discussed in more detail below.

In some embodiments, power manager 106 provides individual power enable signals 108 to each of power gating circuits 104. Each of power gating circuits 104 may couple a supply voltage to its associated circuit block 102 in response to the individual power enable signal 108 for the associated circuit block. In some embodiments, at least one of power gating circuits 104 couple an associated circuit block to Vcc supply voltage 112. This may be referred to as Vcc gating. In some embodiments, at least another of power gating circuits 104 may couple an associated one of circuit blocks to Vss supply voltage 124. This may be referred to as Vss gating. As illustrated in FIG. 1, one of I/O circuit blocks 102C is gated through its associated gating circuit 104 to Vss supply voltage 124. In some embodiments, Vcc supply voltage 112 may either be a positive or negative supply voltage, and Vss supply voltage 124 may be a reference voltage or ground.

In some embodiments, power gating circuits 104 generate power consumption measurements for power manager 106. The power consumption measurements may indicate a power consumption of an associated one of circuit blocks 102. In some embodiments, power gating circuits 104 may generate power consumption measurement signals 110, which may indicate the power consumption of an associated one of circuit blocks 102.

In some embodiments, power gating circuits 104 may store values in one or more registers which may indicate the power consumption of an associated one of circuit blocks 102. In these embodiments, power manager 106 may read the registers and perform operations on or process the values to determine the power consumption of an associated one of circuit blocks 102.

In some embodiments, power gating circuits 104 comprise a power switch responsive to individual power enable signals 108 provided by power manager 106, and circuitry to determine a voltage difference across the power switch. The circuitry may generate digital signals or values in relation to the voltage difference. In some embodiments, the digital signals or values may correspond to the power consumption of an associated one of circuit blocks 102. Embodiments of power gating circuits 104 are discussed in more detail below.

In some embodiments, power manager 106 may comprise logic circuitry including firmware and/or software to perform a power management procedure, such as procedure 800 (FIG. 8) based on the power consumption measurements from gating circuits 104, as well as other system inputs and system requirements. In some embodiments, the power management procedure may include performing a power consumption optimization algorithm to help optimize an overall power consumption of integrated circuit 100. As part of the power managing procedure, power manager 106 may gate-on and gate-off selective ones of circuit blocks 102 in response to the performance of the power consumption optimization algorithm. In some embodiments, the power management procedure may include algorithms to help reduce heat being generated in one or more circuit blocks 102 of integrated circuit 100 based on the power consumption measurements of circuit blocks 102. As can be seen, power manager 106 may provide fine-grain power sensing and control of power distribution within integrated circuit 100.

In some embodiments, power manager 106 may use other system inputs including a battery state or charge level (i.e., in the case of battery power devices) and/or thermal or temperature measurements to help prolong battery usage time. In some embodiments, power manager 106 may monitor the total power consumption to reduce peak power consumption and provide a more level or uniform power consumption to help extend battery life and/or battery usage time.

In some embodiments, power manager 106 may operate as part of microprocessor 102A, although the scope of the invention is not limited in this respect. In some embodiments, power manager 106 may include operating system software and may monitor the power consumption of the individual circuit blocks for logging purposes. In this way, predicted and actual power consumption may be compared for use in design verification, among other things.

In some embodiments, circuit block 102A may be a microprocessor that includes multiple functional units, such as one or more floating point units (FPUs) 116, integer multipliers and/or a single instruction multiple data (SIMD) operation unit. In these embodiments, power gating circuit 104A may be associated with one of the multiple functional units, such as FPU 116, and power gating circuit 104B may be associated with other functional units of microprocessor 102A. In these embodiments, power gating circuit 104A may selectively couple FPU 116 with a supply voltage in response to a power enable signal from power manager 106, and power gating circuit 104B may selectively couple at least some of the other circuitry of microprocessor 102A with a supply voltage in response to another power enable signal from power manager 106.

Figure 2:
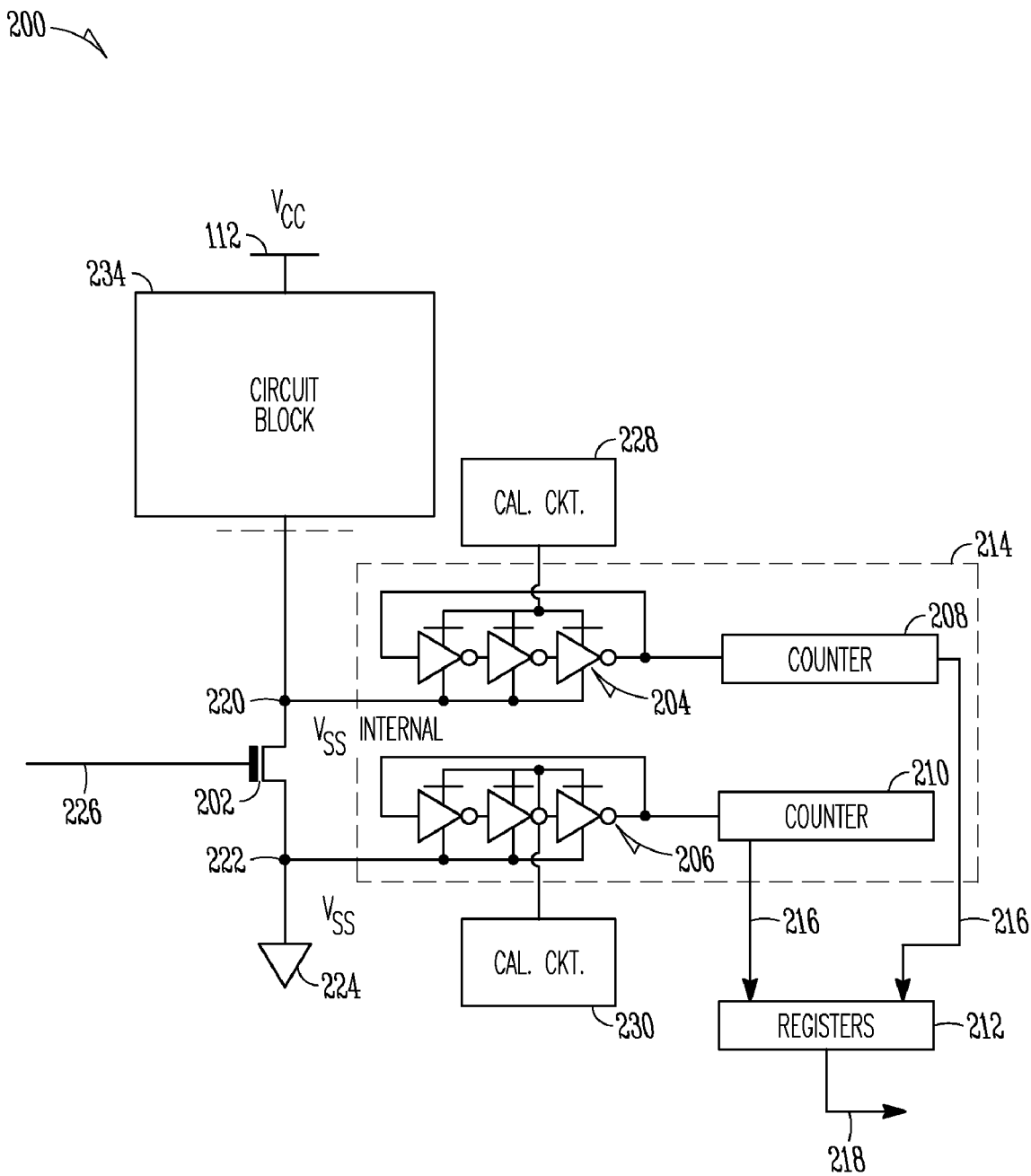
FIG. 2 is a block diagram of a power gating circuit in accordance with some embodiments of the present invention.

FIG. 2 is a block diagram of a power gating circuit in accordance with some embodiments of the present invention. Power gating circuit 200 may be suitable for use as one or more of power gating circuits 104 (FIG. 1), although other power gating circuit configurations may also be suitable.

In accordance with some embodiments, power gating circuit 200 includes power switch 202 responsive to power enable signal 226 and circuitry 214 to determine a voltage difference across power switch 202 and to generate digital signals 216 in relation to the voltage difference. Digital signals 216 may correspond to power consumption measurement 218 of an associated circuit block, such as circuit block 234.

In some embodiments, power enable signal 226 may be provided by power manager 106 (FIG. 1). When enabled by power enable signal 226, power switch 202 couples circuit block 234 to Vss 224. A voltage difference between nodes 220 and 222 of power switch 202 is related to the current being consumed by circuit block 234.

In some embodiments, power gating circuit 200 may include one or more registers 212. In these embodiments, digital signals 216 may comprise values stored by circuitry 214 in the one or more registers 212. In these embodiments, power manager 106 (FIG. 1) may read the values in registers 212 to determine the power consumption of circuit block 234.

In some embodiments, power gating circuit 200 may include first ring oscillator 204 to generate a first frequency based on a first voltage at node 220 of power switch 202, and second ring oscillator 206 to generate a second frequency based on a second voltage at node 222 of power switch 202. The power consumption of circuit block 234 may be determined based on the difference between the first and second frequencies. In some embodiments, each ring oscillator may comprise a voltage controlled oscillator (VCO) having an output frequency related to its input voltage. In some embodiments, the ring oscillators may comprise an odd number of inverter circuits configured in series to oscillate by having their output coupled to their input, although the scope of the invention is not limited in this respect.

In some embodiments, power gating circuit 200 may also include counter 208 to generate a first value based on the first frequency, and counter 210 to generate a second value based on the second frequency. Registers 212 may store the first and second values for use by the power manager 106 (FIG. 1).

In some embodiments, power manager 106 (FIG. 1) may set the counters to count down from a predetermined value. In these embodiments, counter 208 may reach zero last because ring oscillator 206 may generate a higher frequency. This is because node 220 may be at a higher voltage and thus the overall voltage applied to ring oscillator 206 may be greater. In these embodiments, the power consumption may be directly determined from the value in counter 208. In some embodiments, power manager 106 (FIG. 1) may sample the value in registers 212 when counter 208 reaches zero, although the scope of the invention is not limited in this respect. In this way, power gating circuit 200 may require little calibration. Furthermore, no or limited calculation may be necessary to be performed on the counter results to determine the corresponding current through power switch 202.

In some embodiments, power gating circuit 200 may include optional calibration setting circuitry 228 and 230 to set currents for the ring oscillators. In these embodiments, calibration circuitry 228 and 230 may generate predetermined currents for the inverters of the ring oscillators based on calibrated settings. In this way, the oscillators may be set to generate a certain frequency at a certain input voltage allowing the values in registers 212 to be associated with known power consumption levels. These embodiments are discussed in more detail below.

In some embodiments, a look-up-table may be used by power manager 106 (FIG. 1) to determine power consumption of an associated one of circuit blocks 102 (FIG. 1) based on values in registers 212. In these embodiments, calibration circuitry 228 and 230 may be optional. In some embodiments, the look-up-table or other data structure may be stored in a memory accessible to power manager 106 (FIG. 1). The look-up-table may be generated during a calibration procedure.

Circuit block 234 is illustrated in FIG. 2 for ease in understanding embodiments of the invention and is not part of power gating circuit 200. Circuit block 234 may correspond to any one of circuit blocks 102 (FIG. 1). The configuration of power gating circuit 200 illustrates Vss gating of circuit block 234, however power gating circuit 200 is equally applicable to Vcc gating. For Vcc gating, circuit block 234 would be coupled in between Vss 224 and node 222, rather than operating in between Vcc 112 and node 220. For Vss gating, power switch 202 may be an N-channel metal-oxide semiconductor (NMOS) transistor and for Vcc gating, power switch may be a P-channel MOS (PMOS) transistor, although the scope of the invention is not limited in this respect. Power switching devices, besides MOS devices, are also suitable for use as power switch 202.

Figure 3A:
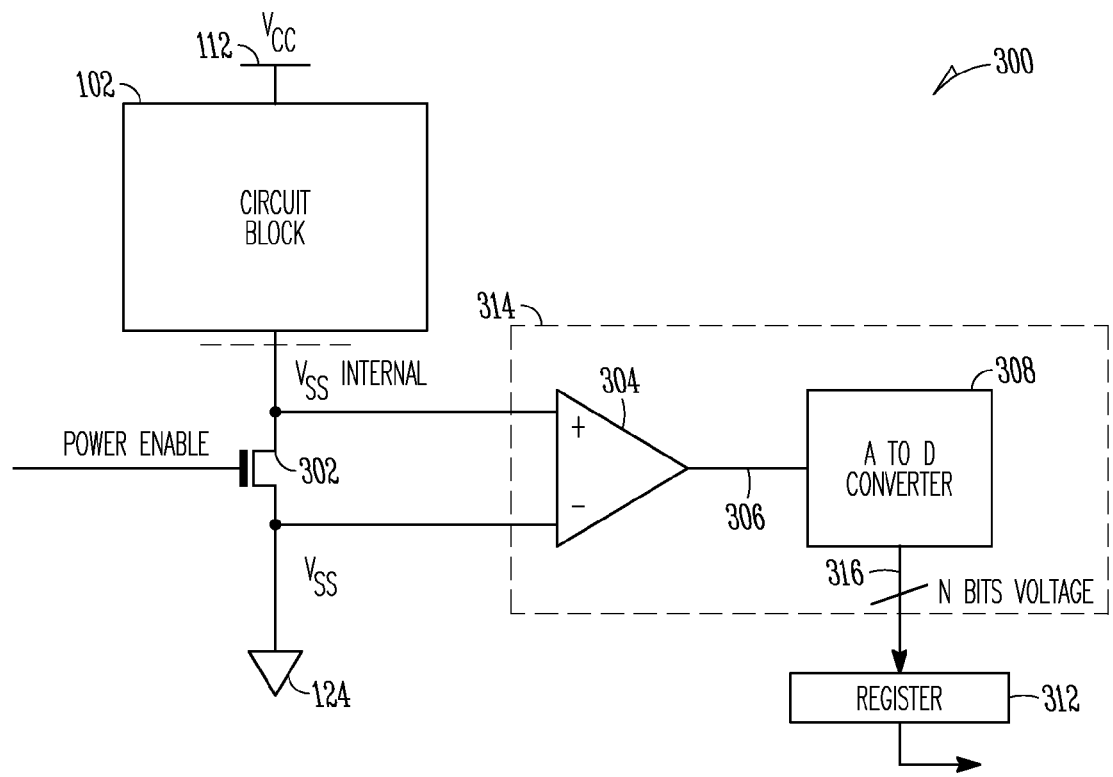
FIGS. 3A and 3B are block diagrams of power gating circuits in accordance with some other embodiments of the present invention.
Figure 3B:
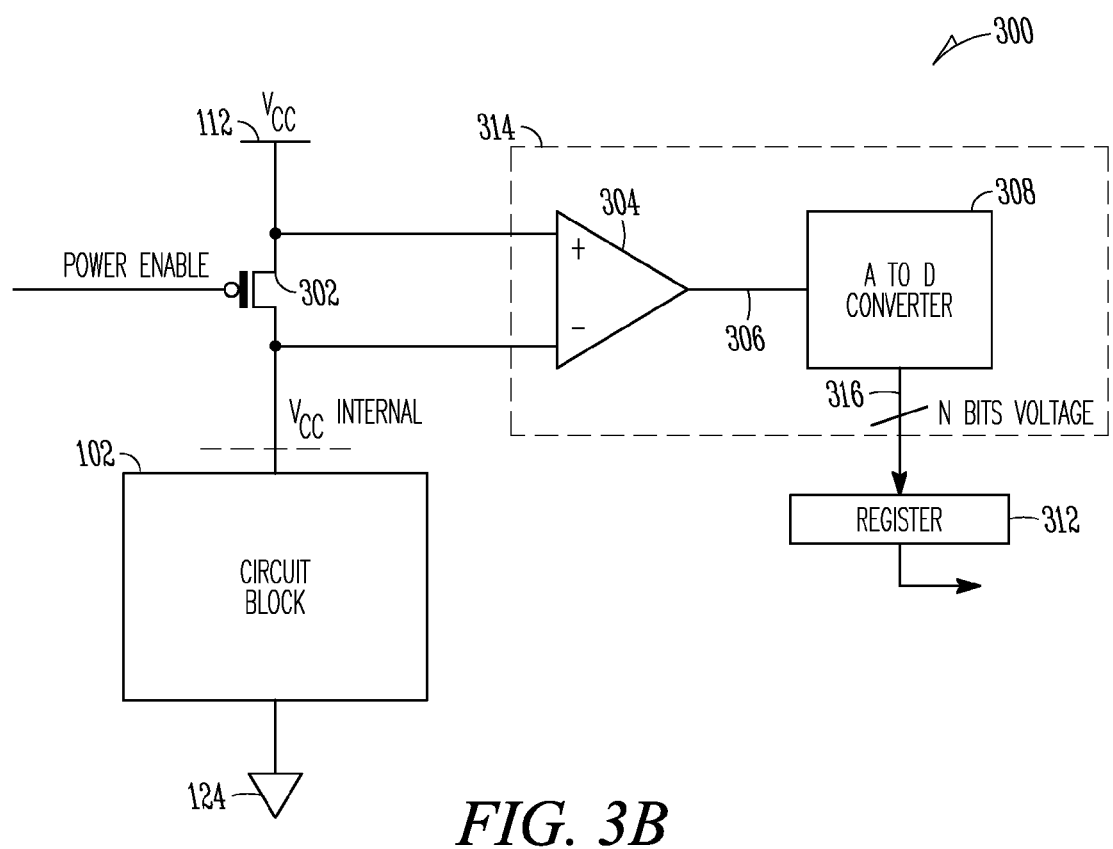

FIGS. 3A and 3B are block diagrams of power gating circuits in accordance with some other embodiments of the present invention. FIG. 3A illustrates a power gating circuit that performs Vss gating, and FIG. 3B illustrates a power gating circuit that performs Vcc gating. In accordance with some embodiments, power gating circuits 300 (FIGS. 3A and 3B) include power switch 302 responsive to a power enable signal and circuitry 314 to determine a voltage difference across power switch 302 and to generate digital values 316 in relation to the voltage difference. Digital values 316 may correspond to a power consumption measurement of an associated circuit block.

In these embodiments, power gating circuits 300 (FIGS. 3A and 3B) may include differential amplifier 304 to provide output 306 in relation to a differential voltage across the power switch 302. Power gating circuit 300 may also include analog-to-digital converter 308 to generate digital value 316 based on output 306, and register 312 to store digital value 316 for subsequent use by power manager 106 (FIG. 1). In some embodiments, amplifier 304 may be an operational amplifier, although the scope of the invention is not limited in this respect.

Figure 4:
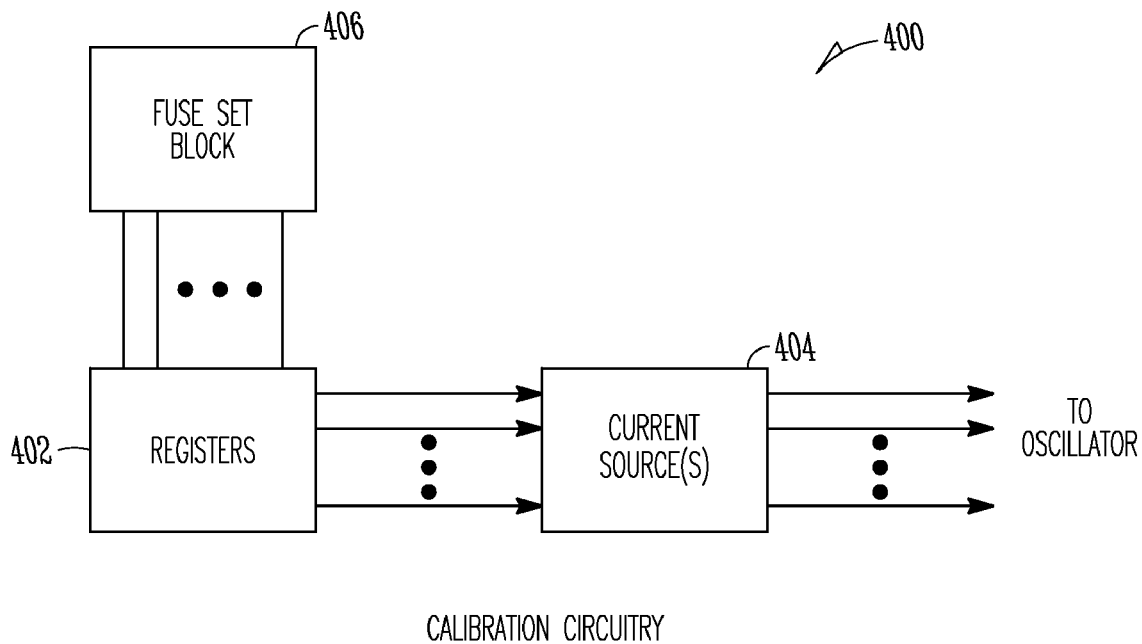
FIG. 4 is a block diagram of calibration setting circuitry in accordance with some embodiments of the present invention.

FIG. 4 is a block diagram of calibration setting circuitry in accordance with some embodiments of the present invention. Calibration setting circuitry 400 may be suitable for use as each of calibration setting circuitry 228 & 230 (FIG. 2) to set currents for the ring oscillators. In some embodiments, calibration setting circuitry 400 may include programmable (or settable) registers 402 coupled with current sources 404. Current sources 404 may generate current for the individual inverters of the ring oscillators based on individual settings in programmable registers 402.

In some embodiments, calibration setting circuitry 400 may include fuse block 406 to set values in programmable registers 402 based on a calibration procedure which may be performed for integrated circuit 100 (FIG. 1). In some embodiments, the function of fuse block 406 may be implemented using Flash memory or other non-volatile memory technology. In some embodiments, the memory may be on-die, while in other embodiments, the memory may be off-die but within the same package, although the scope of the invention is not limited in this respect.

In some embodiments, gating circuits 104 (FIG. 1) on the same integrated circuit may have the same calibration settings (i.e., the values set in fuse block 406) because circuit to circuit variation on a single integrated circuit may be small. In these embodiments, a single calibration may be performed for each integrated circuit, although the scope of the invention is not limited in this respect. In other embodiments, a calibration procedure may be performed for each gating circuit 200 (FIG. 2) on an integrated circuit, although the scope of the invention is not limited in this respect. As part of any of the calibration procedures, the oscillators may be set to generate a certain frequency at a certain input voltage allowing the values in registers 212 (FIG. 2) to be associated with known power consumption levels.

Figure 5:
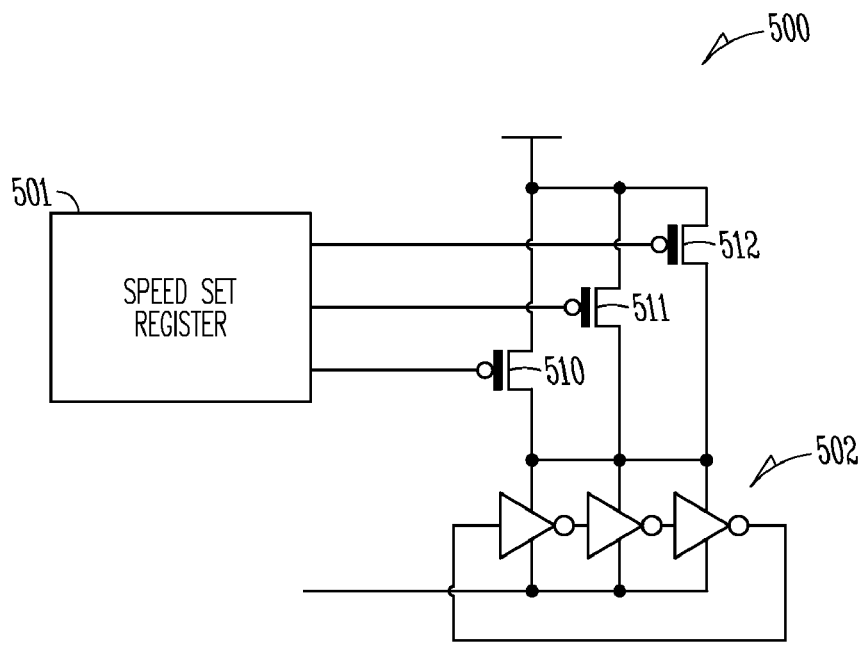
FIG. 5 is a block diagram of calibration circuitry in accordance with some embodiments of the present invention.

FIG. 5 is a block diagram of calibration circuitry in accordance with some embodiments of the present invention. Calibration circuitry 500 may be suitable for uses as calibration circuitry 400 (FIG. 4) to control oscillator 502. Oscillator 502 may correspond to either ring oscillator 204 (FIG. 2) or ring oscillator 206 (FIG. 2) and is not part of calibration circuitry 500. Calibration circuitry 500 comprises speed set register 501 and transistors 510, 511 and 512. Speed set register 501 may control transistors 510, 511 and 512, which may have widths that are powers of two of each other. One or more binary values in speed set register 501 may control the total width of the transistors that are turned on and consequently the current into the associated inverter of oscillator 502. By changing one or more of the binary values in speed set register 501, the oscillator's speed may be calibrated, for example, at test time, to be an expected value at an expected voltage. In some other embodiments, current may be set using register 501 and a current mirror may be used to control the oscillator's current, although scope of the invention is not limited in this respect.

Figures 6, 7:
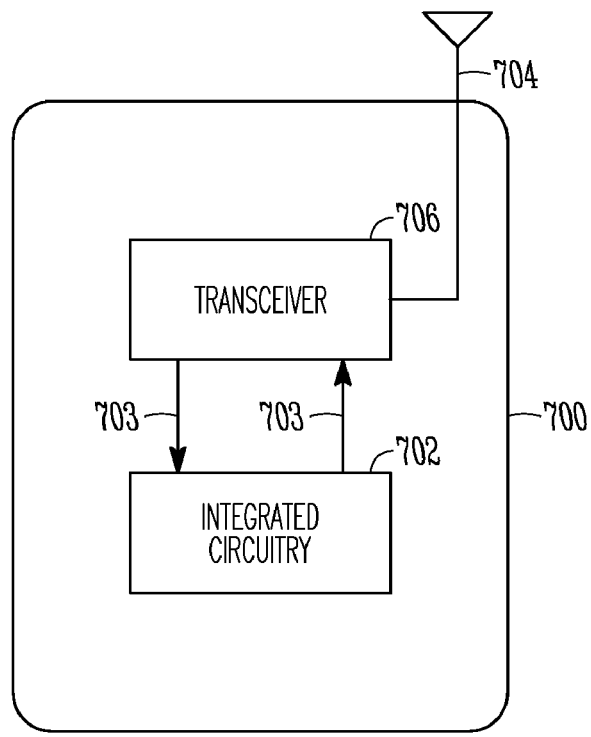
FIG. 6 is a calibration table in accordance with some embodiments of the present invention.
FIG. 7 is a block diagram of a wireless communication device in accordance with some embodiments of the present invention.

FIG. 6 is a calibration table in accordance with some embodiments of the present invention. Table 600 may be a look up table used by power manager 106 (FIG. 1) to correlate applied voltage 602 with measured values 604 for differing current conditions. In some embodiments, applied voltage 602 may correspond to the voltage applied to one of gating circuits 104 (FIG. 1), while measured values 604 may correspond to the measured voltage at the output of the gating circuit 104 (FIG. 1).

FIG. 7 is a block diagram of a wireless communication device in accordance with some embodiments of the present invention. Wireless communication device 700 may include transceiver 706 to communicate wireless signals, and integrated circuitry 702 to communicate digital data signals 703 with the transceiver. In some embodiments, integrated circuitry 702 may provide digital data signals 703 to a transmitter portion of transceiver 706 for subsequent modulation and transmission over a communication channel. In some embodiments, a receiver portion of transceiver 706 may demodulate signals received over the communication channel and may provide associated digital signals 703 to integrated circuitry 702. Wireless communication device 700 may also include other elements not separately illustrated in FIG. 7. In some embodiments, integrated circuit 100 (FIG. 1) may be suitable for use as at least a part of integrated circuitry 702, although the scope of the invention is not limited in this respect.

In some embodiments, transceiver 706 may be a multicarrier transceiver and may communicate multicarrier communication signals, such as orthogonal frequency division multiplexed (e.g., OFDM) communication signals or discrete multitone (DMT) modulated signals. In some embodiments, transceiver 706 may communicate multicarrier packets on a multicarrier communication channel. The multicarrier channel may comprise a plurality of orthogonal subcarriers. In some embodiments, the orthogonal subcarriers of a channel may be closely spaced OFDM subcarriers. To achieve orthogonality between closely spaced subcarriers, in some embodiments, the subcarriers of a particular channel may have a null at substantially a center frequency of the other subcarriers of that channel, although the scope of the invention is not limited in this respect.

Antenna 704 may comprise one or more of a directional or omnidirectional antenna, including, for example, a dipole antenna, a monopole antenna, a loop antenna, a microstrip antenna or other type of antenna suitable for reception and/or transmission of wireless signals.

In some embodiments, wireless communication device 700 may be a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, transceiver 706 may transmit and/or receive radio-frequency (RF) communications in accordance with specific communication standards, such as the Institute of Electrical and Electronics Engineers (IEEE) standards including IEEE 802.11(a), 802.11(b), 802.11(g/h) and/or 802.11(n) standards for wireless local area networks (WLANs) and/or 802.16 standards for wireless metropolitan area networks (WMANs), although device 700 may also be suitable to transmit and/or receive communications in accordance with other techniques including the Digital Video Broadcasting Terrestrial (DVB-T) broadcasting standard, and the High performance radio Local Area Network (HiperLAN) standard.

Although some embodiments of the present invention are discussed in the context of an 802.11x implementation (e.g., 802.11a, 802.11g, 802.11 HT, etc.), the scope of the present invention is not limited in this respect. Some embodiments of the present invention may be implemented as part of a wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

Although wireless communication device 700 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Figure 8:
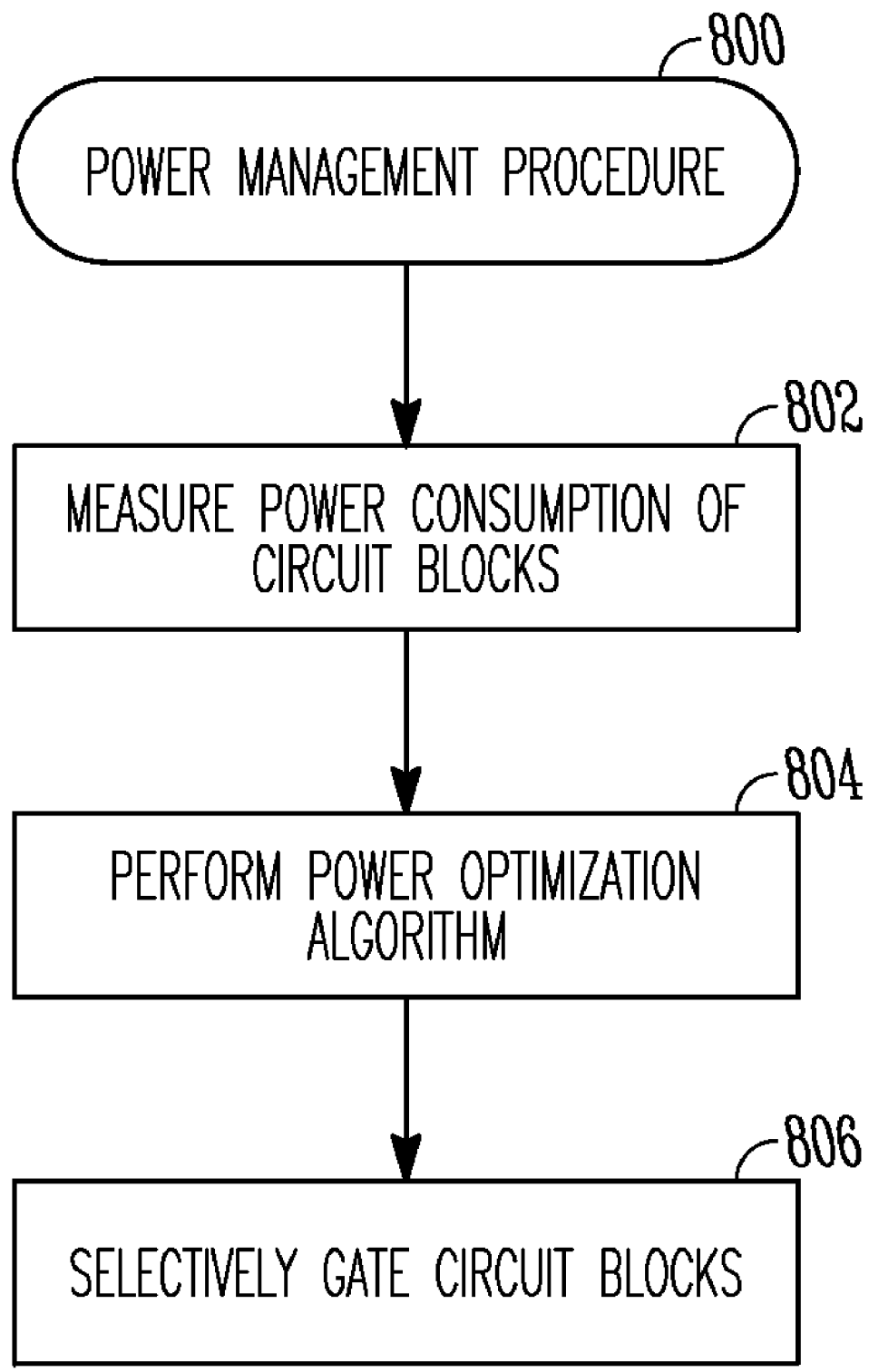
FIG. 8 is a flow chart of a power management procedure in accordance with some embodiments of the present invention.

FIG. 8 is a flow chart of a power management procedure in accordance with some embodiments of the present invention. Power management procedure 800 may be performed by a power manager of an integrated circuit, such as power manager 106 (FIG. 1), although power managers of other integrated circuitry may also perform procedure 800.

Operation 802 comprises measuring the power consumption of one or more circuit blocks of an integrated circuit. In some embodiments, operation 802 monitors the power consumption of individual circuit blocks 102 (FIG. 1) with an associated gating circuit 104 (FIG. 1).

Operation 804 comprises performing a power consumption optimization algorithm. In some embodiments, operation 804 comprises performing a power consumption optimization algorithm based on a cumulative power consumption of the individual circuit blocks. The circuit blocks may include a microprocessor, a digital signal processor (DSP), and/or one or more input-output (I/O) circuits (102C), although the scope of the invention is not limited in this respect.

In some embodiments, the power consumption optimization algorithm may throttle frequency of operation and/or voltage when peak power consumption is high. In some embodiments, the power consumption optimization algorithm may load-balance computation between circuit blocks 102 (FIG. 1), and/or reduce the voltage and/or frequency appropriately (i.e., parallel processing). In some embodiments, higher consumption by one of circuit blocks 102 (FIG. 1) may trigger a re-balance. In some embodiments, the power consumption optimization algorithm may include a strength reduction of operations being performed by integrated circuit 100 (FIG. 1). In some embodiments, less expensive operations (in terms of power consumption) may be performed when available. For example, when a multiplier circuit is consuming a lot of power, the peak consumption may be reduced by performing multiply operations with add and shift circuitry. In some embodiments, the power consumption optimization algorithm may shut off some physical memory and may use a processor's virtual memory system. In some embodiments, the power consumption optimization algorithm may, in the case of multi-bank memories, rebalance the load of the memory banks if a bank is doing more than its share and may adjust their voltage accordingly.

Operation 806 comprises selectively gating the circuit blocks of the integrated circuit. In some embodiments, operation 806 comprises providing power enable signals 110 (FIG. 1) to gating circuits 104 (FIG. 1) to selectively gate (e.g., individually couple and decouple select ones) circuit blocks 102 (FIG. 1) with power supply voltages based on the power consumptions. In some embodiments, operation 806 may be performed based on a total or global power consumption management procedure performed for the entire integrated circuit.

In some embodiments, procedure 800 monitors, controls, and/or optimizes the power consumption in an integrated circuit. In some embodiments, operation 802 comprises generating a first frequency based on a first voltage of a power switch, and generating a second frequency based on a second voltage of the power switch. In these embodiments, the power consumption of an associated circuit block may be related to the difference between the first and second frequencies.

Although the individual operations of procedure 800 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any tangible mechanism for storing information in a form readable by a machine (e.g., a computer). For example, a machine-readable medium may include read-only memory (ROM), random-access memory (RAM), magnetic disk storage media, optical storage media, and flash-memory devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. An integrated circuit comprising:
   a plurality of circuit blocks;
   power gating circuits to selectively couple an associated one of the circuit blocks with a supply voltage and to monitor power consumption of the associated one of the circuit blocks after the supply voltage is coupled thereto; and
   a power manager to control the initial coupling of the supply voltage to one of the circuit blocks by the power gating circuits and to control subsequent coupling of the supply voltage to one of the circuit blocks by the power gating circuits selectively based at least in part on the monitored power consumption,
   and
   wherein for at least one circuit block, the power consumption is monitored based on a difference between voltages across a power switch of a power gating circuit with the at least one circuit block.

2. The integrated circuit of claim 1 wherein the power manager provides individual power enable signals to each of the power gating circuits, each of the power gating circuits to couple a supply voltage to the associated circuit block in response to the individual power enable signal for the associated circuit block, and
   wherein for at least one circuit block, the power consumption is monitored based on a difference between first and second frequencies generated from voltages across a power switch of a power gating circuit associated with the at least one circuit block.

3. The integrated circuit of claim 1 wherein at least one of the power gating circuits couple an associated circuit block to a Vcc supply voltage, and
   wherein at least another of the power gating circuits couple an associated one of the circuit blocks to a Vss supply voltage.

4. The integrated circuit of claim 1 wherein the power gating circuits comprise:
   a power switch responsive to a power enable signal provided by the power manager; and
   circuitry to determine a voltage difference across the power switch and generate digital signals in relation to the voltage difference, the digital signals corresponding to the monitored power consumption.

5. The integrated circuit of claim 4 wherein the power gating circuits further comprise one or more registers, and wherein the digital signals comprise values stored by circuitry in the one or more registers, the power manager to read the values in the one or more registers to determine the power consumption of the associated circuit block.

6. An integrated circuit comprising:
   a plurality of circuit blocks;
   power gating circuits to selectively couple an associated one of the circuit blocks with a supply voltage and to monitor power consumption of the associated one of the circuit blocks after the supply voltage is coupled thereto; and
   a power manager to control the initial coupling of the supply voltage to one of the circuit blocks by the power gating circuits and to control subsequent coupling of the supply voltage to one of the circuit blocks by the power gating circuits selectively based at least in part on the monitored power consumption,
   wherein the power gating circuits comprise:
   a power switch responsive to a power enable signal provided by the power manager;
   circuitry to determine a voltage difference across the power switch and generate digital signals in relation to the voltage difference, the digital signals corresponding to the monitored power consumptions;
   one or more registers, and wherein the digital signals comprise values stored by circuitry in the one or more registers, the power manager to read the values in the one or more registers to determine the power consumption of the associated circuit block,
   a first ring oscillator to generate a first frequency based on a first voltage of the power switch; and
   a second ring oscillator to generate a second frequency based on a second voltage of the power switch,
   wherein the power consumption of the associated circuit blocks is determined based on the difference between the first and second frequencies.

7. The integrated circuit of claim 6 wherein the power gating circuits further comprise:
   a first counter to generate a first value based on the first frequency; and a second counter to generate a second value based on the second frequency,
wherein the registers store the first and second values for use by the power manager.

8. The integrated circuit of claim 6 wherein the power gating circuit further comprises calibration circuitry to set currents for the ring oscillators, the calibration circuitry comprising:
programmable registers coupled with current sources, the current sources to generate current for inverters of the ring oscillators based on settings in the programmable registers.

9. The integrated circuit of claim 8 wherein the calibration circuitry further comprises a fuse block to set values in the programmable registers based on a calibration procedure for the integrated circuit.

10. The integrated circuit as claimed in claim 6 further comprising a look-up-table for use by the manager in determining power consumption from the monitored power consumption from the power gating circuits on the integrated circuit based on values in registers.

11. An integrated circuit comprising:
a plurality of circuit blocks;
power gating circuits to selectively couple an associated one of the circuit blocks with a supply voltage and to monitor power consumption of the associated one of the circuit blocks after the supply voltage is coupled thereto;
a power manager to control the initial coupling of the supply voltage to one of the circuit blocks by the power gating circuits and to control subsequent coupling of the supply voltage to one of the circuit blocks by the power gating circuits selectively based at least in part on the monitored power consumption,
wherein the power gating circuits comprise:
a power switch responsive to a power enable signal provided by the power manager;
circuitry to determine a voltage difference across the power switch and generate digital signals in relation to the voltage difference, the digital signals corresponding to the monitored power consumption;
one or more registers, and wherein the digital signals comprise values stored by circuitry in the one or more registers, the power manager to read the values in the one or more registers to determine the power consumption of the associated circuit block;
a differential amplifier to provide an output in relation to a different voltage across the power switch;
an analog-to-digital converter to generate a digital signal based on the output; and
a register to store the digital signal for subsequent use by the power manager.

12. The integrated circuit of claim 3 wherein the power manager comprises logic circuitry including firmware to perform a power management procedure based on the monitored power consumption from the gating circuits,
wherein the power management procedure includes performing a power consumption optimization algorithm to help optimize an overall power consumption of the integrated circuit, the power manager to gate-on and gate-off selective ones of the circuit blocks in response to the performance of the power consumption optimization algorithm.

13. The integrated circuit of claim 1 wherein the power manager comprises, at least in part, software and operates as part of a microprocessor, the microprocessor being one of the circuit blocks.

14. The integrated circuit of claim 1 wherein at least one of the circuit blocks is a microprocessor that includes at least first and second functional units,
wherein a first one of the power gating circuits is associated with the first functional unit, and at least a second one of the power gating circuits is associated with the second functional units, and
wherein the functional units comprise at least one of a floating point unit, an integer multiplier and a single instruction multiple data operation unit.

15. The integrated circuit of claim 1 wherein the circuit blocks include at least some of a microprocessor, a digital signal processor, and one or more input-output (I/O) circuits.

16. A power gating circuit comprising:
a power switch responsive to a power enable signal;
circuitry to determine a voltage difference across the power switch and to generate digital signals in relation to the voltage difference, the digital signals corresponding to a power consumption measurement of an associated circuit block; and
one or more registers, and wherein the digital signals comprise values stored by circuitry in the one or more registers,
wherein the circuitry comprises:
a first ring oscillator to generate a first frequency based on a first voltage of the power switch; and
a second ring oscillator to generate a second frequency based on a second voltage of the power switch,
wherein the power consumption of the associated circuit block is determined based on the difference between the first and second frequencies.

17. The power gating circuit of claim 16 further comprising:
a first counter to generate a first value based on the first frequency; and
a second counter to generate a second value based on the second frequency,
wherein the registers store the first and second values.

18. The power gating circuit of claim 16 further comprising calibration circuitry to set currents for the ring oscillators, the calibration circuitry comprising:
programmable registers coupled with current sources, the current sources to generate current for inverters of the ring oscillators based on settings in the programmable registers.

19. The power gating circuit of claim 18 wherein the calibration circuitry further comprises a fuse block to set values in the programmable registers based on a calibration procedure for the integrated circuit.

20. The power gating circuit of claim 16 wherein a look-up-table is used by a power manager to determine power consumption of the associated circuit block based on values in registers.

21. A power gating circuit comprising:
a power switch responsive to a power enable signal;
circuitry to determine a voltage difference across the power switch and to generate digital signals in relation to the voltage difference, the digital signals corresponding to a power consumption measurement of an associated circuit block; and
one or more registers, and wherein the digital signals comprise values stored by circuitry in the one or more registers,
wherein the circuitry comprises:
a differential amplifier to provide an output in relation to a differential voltage across the power switch;

an analog-to-digital converter to generate a digital value based on the output; and a register to store the digital value for subsequent use by the power manager.

22. A method for gating circuit blocks of an integrated circuit comprising:

measuring a voltage difference across a power switch; and generating digital signals in relation to the voltage difference, the digital signals corresponding to a power consumption measurement of an associated circuit block, wherein the power switch is responsive to a power enable signal, wherein measuring comprises:

generating a first frequency based on a first voltage of the power switch; and generating a second frequency based on a second voltage of the power switch, wherein the power consumption of the associated circuit block is related to the difference between the first and second frequencies.

23. The method of claim 22 further comprising:

generating a first value based on the first frequency;

generating a second value based on the second frequency; and storing the first and second values in registers.

24. The method of claim 22 wherein ring oscillators are used to generate the first and second frequencies, the method further comprising:

setting currents in the ring oscillators with programmable registers so that the ring oscillators generate predetermined frequencies for certain input voltages.

25. The method of claim 22 wherein a look-up-table is used by a power manager to determine power consumption of the associated circuit block based on values in registers.

26. A method for monitoring power consumption in an integrated circuit comprising:

monitoring power consumption of individual circuit blocks with an associated gating circuit; and providing power enable signals to selectively gate the circuit blocks with power supply voltages based on the power consumptions, wherein the gating circuits comprise a power switch, and wherein monitoring further comprises:

measuring a voltage difference across the power switch;

generating digital signals in relation to the voltage difference, the digital signals corresponding to a power consumption measurement of an associated circuit block; and storing values represented by the digital signals in one or more registers, wherein the power switch is responsive to one of the power enable signals, and wherein measuring comprises:

generating a first frequency based on a first voltage of the power switch; and generating a second frequency based on a second voltage of the power switch, wherein the power consumption of the associated circuit block is related to the difference between the first and second frequencies.

27. A wireless communication device comprising:

a power manager;

a transceiver to communicate wireless signals; and integrated circuitry to communicate digital data signals with the transceiver, wherein the integrated circuitry comprises:

a plurality of circuit blocks; and power gating circuits to selectively couple an associated one of the circuit blocks with a supply voltage and to monitor power consumption of the associated one of the circuit blocks after the supply voltage is coupled thereto, a power manager to control the initial coupling of the supply voltage to one of the circuit blocks by the power gating circuits and to control subsequent coupling of the supply voltage to one of the circuit blocks by the power gating circuits selectively based at least in part on the monitored power consumption, wherein the circuit blocks include at least some of a microprocessor, a digital signal processor, and one or more input-output circuits, and wherein for at least one circuit block, the power consumption is monitored based on a difference between voltages across a power switch of a power gating circuit associated with the at least one circuit block.

28. The wireless communication device of claim 27 wherein the power manager provides individual power enable signals to each of the power gating circuits, each of the power gating circuits to couple a supply voltage to the associated circuit block in response to the individual power enable signal for the associated circuit block.

29. The wireless communication device of claim 28 wherein the power gating circuits comprise:

a power switch responsive to a power enable signal provided by the power manager; and circuitry to determine a voltage difference across the power switch and generate digital signals in relation to the voltage difference, the digital signals corresponding to the monitored power consumption.

30. The wireless communication device of claim 29 wherein the power manager comprises logic circuitry including firmware to perform a power management procedure based on the monitored power consumption from the gating circuits, wherein the power management procedure includes performing a power consumption optimization algorithm to help optimize an overall power consumption of the integrated circuit, the power manager to gate-on and gate-off selective ones of the circuit blocks in response to the performance of the power consumption optimization algorithm.

31. The wireless communication device of claim 30 wherein the transceiver is a multicarrier transceiver, and wherein the power management procedure monitors a battery charge state to extend battery usage time.

32. A machine-readable medium that provides instructions, which when executed by one or more processors, cause the processors to perform operations comprising:

monitoring power consumption of individual circuit blocks with an associated gating circuit;

providing power enable signals to selectively gate the circuit blocks with power supply voltages based on power consumption, performing a power consumption optimization algorithm based on a cumulative power consumption of the circuit blocks, measuring a voltage difference across a power switch;
generating digital signals in relation to the voltage difference, the digital signals corresponding to a power consumption measurement of an associated circuit block; and
storing values represented by the digital signals in one or more registers, the power switch being responsive to one of the power enable signals,
generating a first frequency based on a first voltage of the power switch; and
generating a second frequency based on a second voltage of the power switch,
wherein the power consumption of the associated circuit block is related to the difference between the first and second frequencies,
wherein a power manager of the integrated circuit performs the monitoring and providing,
wherein the circuit blocks include at least some of a microprocessor, a digital signal processor, and one or more input-output (I/O) circuits.

* * * * *

UNITED STATES PATENT AND TRADEMARK OFFICE
CERTIFICATE OF CORRECTION

PATENT NO. : 7,284,137 B2 Page 1 of 1
APPLICATION NO. : 10/881004
DATED : October 16, 2007
INVENTOR(S) : Clark et al.

It is certified that error appears in the above-identified patent and that said Letters Patent is hereby corrected as shown below:

In column 11, line 18, in Claim 10, before "manager" insert -- power --.

Signed and Sealed this

Twenty-fifth Day of December, 2007

JON W. DUDAS
*Director of the United States Patent and Trademark Office*